Nov. 3, 1964    L. E. SALINA    3,155,880
PHASE FAILURE PROTECTION FOR POLYPHASE MOTORS
Filed Jan. 27, 1960    2 Sheets-Sheet 1

INVENTOR.
Louis E. Salina

BY
Christy, Parmelee & Strickland his ATTORNEYS

United States Patent Office 3,155,880
Patented Nov. 3, 1964

3,155,880
PHASE FAILURE PROTECTION FOR
POLYPHASE MOTORS
Louis E. Salina, 522 Summit St., Carnegie, Pa.
Filed Jan. 27, 1960, Ser. No. 4,991
9 Claims. (Cl. 317—46)

This invention is for an apparatus for the protection of polyphase motors against failure of one phase or phase unbalance, and is in the nature of an improvement in the system disclosed in abandoned application Serial No. 767,917, filed jointly by Werner I. Staaf (now deceased) and Louis E. Salina on October 17, 1958.

As pointed out in the aforesaid application, it sometimes happens that one line, for example in a three-phase alternating circuit, may fail, or become unbalanced, perhaps due to storm, blowing of fuse, or some other cause. A polyphase motor supplied with current under these conditions will continue to operate on the current supplied through the remaining two lines, causing the motor to overheat and burn out. The line failure may occur without any manifestation of trouble until the motor is already damaged, and the danger is particularly great in the case of unattended motors, such for example, as motors which are remotely located to drive a pump at a source of water supply, or a motor otherwise located in a remote location or in some outbuilding.

It is also pointed out that sensitive relays located across each phase of the supply line might theoretically be used, each of which would respond to a decrease in voltage in the power supply line which it was intended to monitor. From a practical angle this is not feasible because any relay sufficiently sensitive to distinguish between a line failure or unbalance and the voltage regenerated by the motor running on a single phase would be so sensitive as to respond also to normal line fluctuation common to all three phases and hence interfere with normal functioning of the motor.

While the system disclosed in the joint application with Werner I. Staaf above referred to will perform satisfactorily under most conditions which are encountered, it will fail to detect an imbalance where the input system of the polyphase motor is through a Y-delta transformer, a system sometimes encountered industrially and for reasons which need not be here discussed.

According to the present invention there is provided a system responsive to voltage imbalance in a polyphase circuit for protecting a polyphase motor or motors supplied by said circuit from a voltage imabalance. Each of the three current supply lines to the circuit or motor to be protected is coupled through a voltage transformer to a separate rectifier circuit. This may be accomplished by having the three primary windings of the transformer connected in delta to the three current supply lines, while the secondary of each transformer is connected into a separate rectifier circuit. An output pole of like sign of each rectifier has two branches connected through oppositely-acting diodes to two sides of a common sensing circuit. The other output pole of each rectifier is joined to a connection common to all three rectifier circuits. As long as the voltage in all three lines is equal, said two branches of the sensing circuit will be at equal potential, but if any one phase is out of balance with the other two, there will be a potential difference across the two branch lines. This difference in potential actuates a control circuit to open a main switch to the circuit or motor being monitored or protected. The foregoing rectifiers are preferably half-wave rectifiers, and the other half-wave of each transformer secondary is also rectified and the rectified current of said other half-wave is carried to the control circuit to energize that circuit. The control circuit is an oscillator-amplifier circuit and it oscillates so long as the voltage of all phases are in balance. When a voltage decrease in one phase produces a potential across said two branch lines, that difference of potential imposes a bias on the oscillator of the control circuit to suppress oscillation. The main switch to the circuit or motor being protected remains closed only so long as the control circuit oscillates, and when oscillation is suppressed, said switch will open and remain open until oscillation is resumed. This not only provides a voltage imbalance protective ssytem responsive to an imbalance as low as about 5% without delicate relays or high-resistance relays and which is not responsive to unbalanced current conditions that do not disturb the voltage balance, but it is "fail-safe" in that if there is malfunctioning of any element within the system, including the oscillator or amplifier, the main switch will open as if there were a phase unbalance. If, as sometimes happens during periods of peak loads, the voltage of all three phases drops to the same extent there will be no imbalance, and no harm will result therefrom, and the main switch under such conditions will not open.

The present invention has for its principal object to provide a protection system against phase failure or phase imbalance which will operate in response only to voltage imbalance under all conditions, but which will not respond to normal line current fluctuation where there is no voltage unbalance. The apparatus will not respond to current fluctuations.

A further object of my invention is to provide a system which is much more compact and simple than that disclosed in the aforesaid joint application, and which is substantially more simple and compact than any arrangements heretofore provided for this purpose.

A further object of this invention is to provide a novel sensing circuit which does not require high resistance electromagnetic relays for each phase.

A further object of the invention is to provide a unique circuit for discriminating between voltage drop in one line and normal current fluctuations in the protected lines.

These and other objects and advantages are secured by my invention which may be more fully understood by reference to the accompanying drawings, in which.

Figure 1:
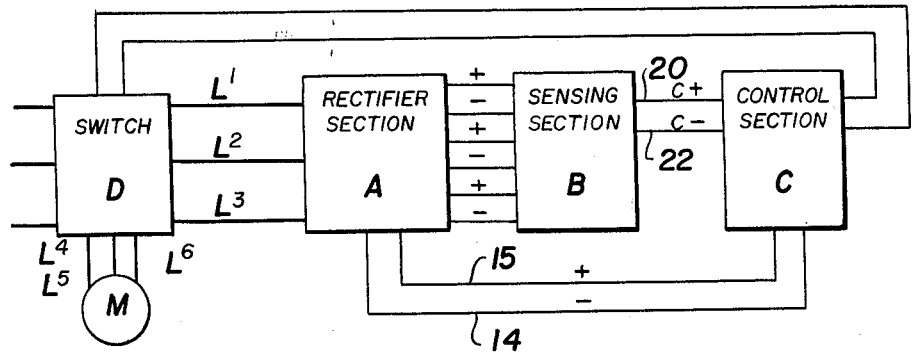
FIG. 1 is a simple block diagram of a system embodying my invention.

Referring first to the block diagram in FIG. 1, A designates the first section of a circuit embodying my invention. The three power supply lines $L^1$, $L^2$ and $L^3$ for a three-phase system are connected into this section. In this section, as will be hereinafter more fully described, there is provision made for rectifying and dividing the current, including means comprising two opposed half-wave rectifier circuits for each phase. One of the half-wave rectifier circuits leads to the unit B, wherein sensing of any imbalance of one phase will be detected, and the output of the sensing circuit passed on to the control unit C which is powered from the direct current delivered by the other half-wave from the rectifiers in A. The control C will usually comprise an oscillator amplifier circuit and a motor-controlling relay actuated thereby, as hereinafter described in detail. Block D indicates the main motor control switch which is actuated to open the circuit upon phase failure, and which per se is not any novel part of this invention.

Figure 2:
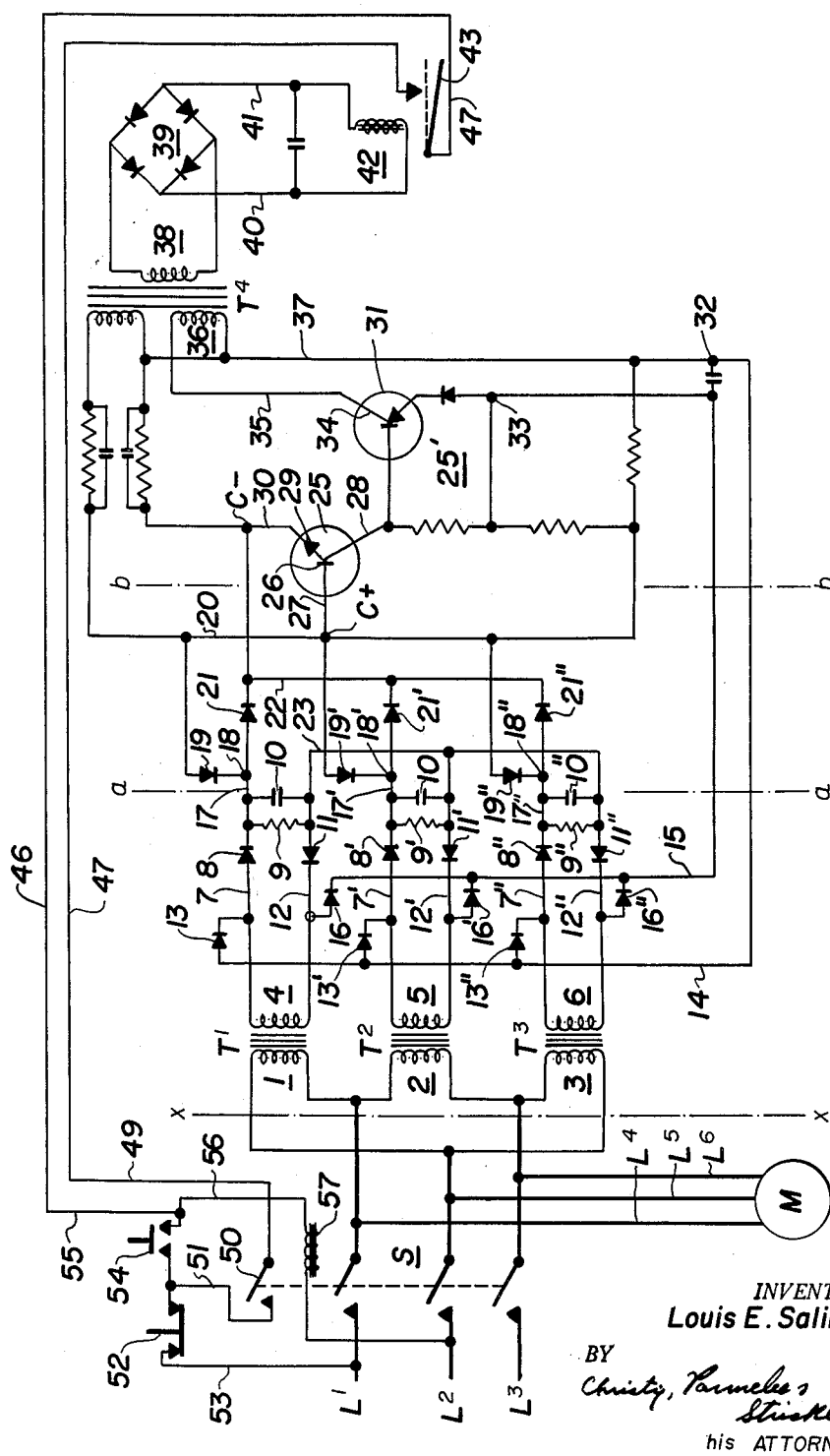
FIG. 2 is a schematic circuit diagram of the system or apparatus.

Referring to FIG. 2, that part of the circuit comprehended within part A of the block diagram in FIG. 1 is to the left of the broken line $a$—$a$ in FIG. 2; that part of the system in block B of FIG. 1 is between lines $a$—$a$ and $b$—$b$; and that part comprising block C is to the right of line $b$—$b$. Anything to the left of line $x$—$x$ in FIG. 2 is the main switch circuit which is not in itself novel and is here included for the purpose of completing the disclosure. The blocks are diagramed only for purposes of explanation, and the apparatus need not exist physically as isolated units. In FIG. 2 there are three voltage transformers $T^1$, $T^2$ and $T^3$ having their primaries connected in delta to the three current supply lines $L^1$, $L^2$ and $L^3$. They are connected through a main control switch S. Lines $L^4$, $L^5$ and $L^6$ connect with lines $L^1$, $L^2$ and $L^3$ respectively, and lead to the polyphase motor M to be protected. The primaries for transformers are designated 1, 2 and 3 respectively. The secondary windings of the transformers are not interconnected as are the primaries. The secondaries for the three transformers are designated 4, 5 and 6, respectively. The secondary 4 is included in a half-wave rectifier circuit comprising wire 7, diode 8, resistor 9, across the terminals of which is a condenser 10, diode 11, and return wire 12. Transformer secondary 5 is similarly included in a half-wave rectifier circuit comprising wire 7′, diode 8′, resistor 9′, across the terminals of which is a condenser 10′. There is a second diode at 11′ and a return circuit 12′. The third secondary is likewise connected through a similar half-wave rectifier circuit in which the corresponding elements are designated 7″, 8″, 9″, 10″, 11″ and 12″ respectively.

The secondary of transformer 4 is included in a second half-wave rectifier circuit comprising diode 13, wire 14, the load to be hereinafter described, to which current is supplied, return wire 15, and diode 16. The diodes 8 and 11 are operatively reversed to the diodes 13 and 16 so that one-half of the current wave is rectified in the circuit comprising the diodes 8 and 11, and the other half of the wave is rectified in the circuit that includes the diodes 13 and 16. The secondaries 5 and 6 of the other two transformers are connected in parallel to the lines 14 and 15 through diodes 13′ and 16′ and 13″ and 16″, respectively. The three half-wave rectifiers comprising diodes 13 and 16 and their counterparts for the other two transformer secondaries are thereby all included in the common direct-current circuit comprising the wires 14 and 15 and the load to which they are connected.

As shown in FIG. 2, one pole of the half-wave rectifier comprising diodes 8 and 11, say the positive pole, is connected through output connection 17 to a point 18. At 18 the circuit divides, one branch being connected through diode 19 to line 20. The other branch connects through diode 21, reversed with respect to diode 19, to line 22. The other pole of the rectifier circuit comprising diodes 8 and 11 is connected to wire 23. In a similar manner the positive pole of the rectifier circuits 8′–11′ is connected through output connection 17′ to point 18′. At point 18′ there are two branches, one branch being connected through diode 19′ to line 20, the other comprising diode 21′ and line 22. The negative pole of this circuit is connected to wire 23. Similarly, the rectifier circuit comprising diodes 8″ and 11″ has its positive pole connected through output connection 17″ to point 18″. From 18″ there are two branches, one being from point 18″ through diode 19″ to wire 20, the other branch comprising diode 21″ and wire 22. The negative pole of rectifier circuit including diodes 8″ and 11″ is connected to wire 23.

Figure 3:
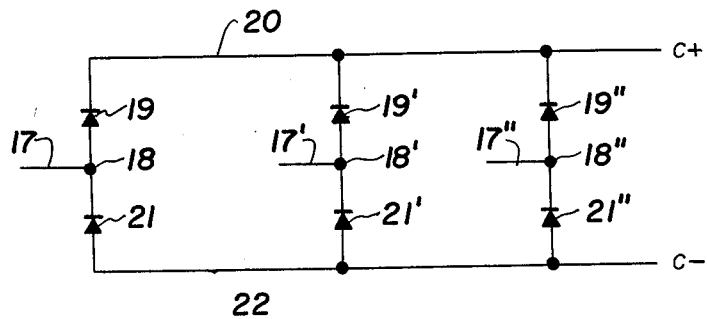
FIG. 3 is a fragmentary simplified diagram of that portion of the circuit shown in FIG. 2 which senses phase unbalance.

When the voltage in lines $L^1$, $L^2$ and $L^3$, is balanced, points 18, 18′ and 18″ of the three output connections are all at an equal positive potential with respect to the negative line 23, and there is no relative potential difference between them, so that wire 20 and wire 22, or points C+ and C− are at equal potential. The function of the diodes may be better understood from the simplified diagram in FIG. 3. In this diagram the reference numerals correspond to FIG. 2. With the three phases in balance, points C+ and C− are at equal potential. Assume, however, that the voltage at 18, 18′ and 18″ is normally 50 volts, but the voltage in line $L^2$ drops to a level where the voltage at 18′ drops for example to 45 volts. Then there is a voltage difference of five volts between point 18′ and points 18 and 18″. Because of the diodes 19 and 21 which are operatively reversed (as are also diodes 19′ and 21′ and 19″ and 21″), there can be no current flow from point 18′ to point 18, nor can there be any current flow from 18′ to 18″. Consequently there is then a potential difference of five volts between C+ and C−. The diodes are here in a direct current circuit and are not rectifiers, but they function to block any flow of current from the two branch circuits 20 and 22 through the several diodes or from the output connection of any one rectifier circuit to the output of any other, so that when the voltage in one rectifier output connection drops below the voltage in the other two outputs, the potential difference then appears across these lines and at C+ and C−.

The potential difference between points C+ and C− may be used in numerous ways to operate some device for opening the motor circuit. This is the function of the section C in the block diagram shown in FIG. 1. In the drawings I have shown a preferred circuit for accomplishing this. In FIG. 2, 25 designates an oscillator-transistor having a base 26 connected through wire 27 with line 20. The collector of the transistor is designated 28, and the emitter electrode is 29. Emitter electrode 29 is connected through wire 30 with wire 22 at point C−. The circuit here shown in a typical regenerative oscillator-amplifier circuit, designated generally at 25′. Since such circuits are well known in the art, the several components will not be described, except those directly necessary to an understanding of this invention. The amplifying transistor is 31. The power input for the oscillator-amplifier transistor circuit is from wires 14 and 15 utilizing the other half cycle of rectified current from the secondary windings 4, 5 and 6, this being the load across wires 14 and 15 earlier referred to. Wires 14 and 15 are connected into the oscillator-amplifier circuit at points 32 and 33. The output of the amplifier-transistor is from collector electrode 34, wire 35, primary 36 of transformer $T^4$, and line 37 to points 32. The oscillator-transistor circuit is a conventional transistor circuit with the components selected, preferably to operate so long as the sensing current imposes no potential difference on points C+ and C−, but the imposition of a potential difference between these points will bias the oscillator-transistor against oscillation, as will be understood by those skilled in the art.

When the oscillator-amplifier circuit is operating, the primary 36 of transformer $T^4$ is energized. The secondary 38 of transformer $T^4$ is thereby energized and the terminals of the secondary 38 are connected to opposite points of a conventional rectifier bridge circuit, 39. The output of the rectifier 39 is through wires 40 and 41 which are connected to the opposite terminals of a relay winding 42. So long as the relay winding 42 is energized, the armature 43 of the relay closes a control circuit to the motor switch, as hereinafter described. The purpose of the oscillator amplifier circuit is to assure fail-safe protection under all conditions of failure. The transformer $T^4$ will not transfer energy except where there is an oscillating current, consequently if there is any failure of the oscillator to function, no oscillating current will be generated and the transformer $T^4$ can transmit no power to the secondary of its transformer.

This control circuit includes wires 46 and 47 leading from the contacts of relay 43 to the motor start-stop switch designated generally as S. Wire 47 connects to wire 49 that leads to a switch 50, and through this switch to normally closed stop switch 52 and wire 53 to line $L^1$. Switch 52 is in series with a start switch 54 shunted around switch 50, and which connects to wire 56 that is connected to one end of an electromagnet 57 which closes and holds closed the switch 50 and the line switches to the motor only when the electromagnet 57 is energized. There is also a branch wire 55 connected to wire 56 and to the line 47. The dotted line in the main switch S indicates that the three line switches and switch 50 are mechanically connected to open and close together, and coil 57, as stated above, holds the switch closed, and the switch S is biased to open if the electromagnet 57 is deenergized. When start switch 54 is closed, a circuit is completed from line $L^1$ through wire 53, stop switch 52, start switch 54, wire 56, and electromagnet 57 to line $L^2$. The main switch then closes, relay 43 is energized, and relay 43 closed, and the circuit is then closed through line 53, stop switch 52, wire 51, switch 50, wire 47, the contacts of relay 43, wire 46, wire 55–56 and electromagnet 57 to line $L^2$. If relay 43 opens, the switch S will open and start switch 54 must be closed to again start the motor. Switch 54 may be a manual switch, or be operated by a float, thermostat, clock, or other automatic device. If the switch 54 is other than a manual switch, the main control switch will be closed if the float or other control mechanism has closed the switch 54 as soon as normal voltage balance is established in the three phrases. The main control switch S and the start and stop switches are conventional equipment and form no part of the present invention.

As long as the voltage of the three phases is in balance and there is no potential difference imposed by the sensing circuit between points C+ and C—, the oscillator amplifier circuit will continue to function, and the main switch control circuit will be energized. If a condition of voltage unbalance develops in one line, creating a potential difference between points C+ and C—, a biasing voltage is imposed thereby on the oscillator-transistor 25 to suppress oscillation, as a result of which there will be no energy transfer through the transformer $T^4$ and the relay winding 42 will be deenergized to effect the opening of the relay 43, and the deenergizing of the main switch-closing magnet 57.

I prefer to use the oscillator-amplifier circuit as above described, and to provide for the oscillation of the circuit under all normal conditions, since it will provide a "fail-safe" protection. If any part of the circuit, including the transistors or the power supply, fails, the relay 42 will be deenergized. The current consumption required for the operation of the device is negligible, so that from this standpoint continuous oscillation of the oscillator-amplifier circuit is not objectionable.

While I prefer to operate the system in the manner above described because of the fail-safe protection which is provided, it would of course be possible to modify the circuit in various ways. For example, transistor 25 might be used as a simple on-and-off control that would pass current to a relay, but in such case a defective transistor might continue to pass current when it should cut off. Also, in lieu of an oscillator-amplifier transistor circuit responsive to a potential difference between points C+ and C—, a vacuum tube oscillator-amplifier circuit could be substituted, or a sensitive relay could be directly connected across the points C+ and C—. A vacuum tube circuit, however, has the disadvantage that more space is required, and the energy requirements are somewhat greater. The advantage of using an oscillator-amplifier circuit over a sensitive relay is that an oscillator-amplifier circuit is more positive and less sensitive to mechanical difficulties, and less difficult to adjust. The amplifier in the oscillator circuit could be dispensed with, but it is preferred to use an amplifier in order to secure assurance of more positive performance.

It will be seen that once the main switch S has been opened, the switch S will not close until the start switch 54 is closed. For this reason, once a condition of voltage imbalance occurs, the motor is disconnected from the line until the start switch 54 is closed either manually or by a float thermostat or other automatic sensing means. The system will not be affected by fluctuation of the line voltage which is normal in commercial power lines, and which occurs simultaneously in all three lines, because this fluctuation will cause all three points 18, 18' and 18" to vary in voltage to the same extent, and there will therefore be no potential difference at points C+ and C—, although there may be a simultaneous rise or fall of potential relative to line 23 at all three points 18, 18' and 18". It may also be noted that if there is any imbalance between one phase and the other two, the reduction of energy in the power output lines 14 and 15 is relatively so slight that it will not affect the power supply to the oscillator-amplifier circuit, so that a decrease in voltage in one phase will not of itself be sufficient to suppress oscillation in the oscillator-amplifier circuit so that the sensing device to create a biasing voltage on the oscillator as above explained is necessary. The power for the oscillator-amplifier circuit could of course be derived in other ways, as from a separate power pack energized from the lines $L^1$, $L^2$ and $L^3$, but the circuit shown is compact and well-adapted to the purpose and avoids the need for separate transformers and is fail-safe.

While I have shown and described one specific embodiment of my invention, it will be understood that this is by way of illustration and that various modifications and changes may be made within the contemplation of my invention and under the scope of the following claims.

I claim:

1. Apparatus for protecting a polyphase motor against phase voltage imbalance comprising three voltage transformers adapted to have their primary windings connected in delta across three power supply lines of a polyphase current supply source, each transformer having a separate secondary winding, a separate rectifier circuit connected across each transformer secondary, each rectifier circuit having a sensing circuit output connection of like polarity, a sensing circuit having two branches, each branch being connected to each said output connection through a separate diode, the diodes connecting one branch to the several output connections being reversed to those connecting the other branch to the several output connections to thereby block current flow from one branch to the other through the diodes, said branches constituting the only common circuit between the output connection of the several rectifier circuits whereby said branches will be at equal potential when all phases are in balance and will be at different potentials when one phase is unbalanced, and a motor switch opening circuit responsive to a difference of potential between said branches.

2. Apparatus for protecting a polyphase motor against phase voltage imbalance comprising three voltage transformers adapted to have their primary windings connected in delta across three power supply lines of a polyphase current supply source, each transformer having a secondary winding, a separate rectifier circuit connected across each secondary, each rectifier circuit having a sensing circuit output connection of like polarity, a sensing circuit having two branches, each branch being connected to each said output connection through a separate diode, the diodes connecting one branch to the several output connections being reversed to those connecting the other branch to the several output connections to thereby block current flow from one branch to the other through the diodes, said branches constituting the only common circuit between the output connections of the several rectifier circuits whereby said branches will be at equal potential when all phases are in balance and will be at different potentials when one phase is unbalanced, an oscillating circuit to which the branches are connected at points to suppress oscillation when the two branches are at different potentials, a transformer having its primary energized by the oscillating circuit, said transformer having a secondary winding in which a current flow is induced when the oscillating circuit is oscillating, a relay energized by the said secondary winding, and a motor control switch means responsive to the deenergizing of the relay to open current supply lines to which the polyphase motor to be protected is connected when the relay is deenergized.

3. Apparatus for protecting a polyphase motor against phase voltage imbalance as defined in claim 2 in which the oscillating circuit is an amplifying oscillating circuit.

4. Apparatus for protecting a three-phase motor against phase voltage failure wherein the motor is connected to three current supply lines of a three-phase power system, said protecting apparatus comprising three voltage transformers having their primary windings connected in delta across the three supply lines, each transformer having a separate secondary, each secondary having a half-wave rectifier connected across its terminals to rectify half the alternating current cycle induced in the secondary, each secondary having a second half-wave rectifier connected across its terminals and operatively reversed with respect to the first mentioned half-wave rectifier across the same secondary to rectify the other half cycle induced in said secondary, the first-named half-wave rectifiers having their terminals of one polarity connected together and each of the terminals of the other polarity provided with an output connection, the second-mentioned half-wave rectifiers being connected in parallel to provide a direct current power source, a sensing circuit having two branches, one branch being separately connected to each of said output connections through a diode, the second branch being also separately connected to each output connection through a separate diode, the diodes to the same branch from the several output connections being conductive in the same direction and the diodes connected to one branch being effective in the opposite direction to those connected to the other branch whereby there can be no current flow from one branch to the other through the several diodes, the two branches thereby having a potential difference between them only when the voltage of one output connection is different from the voltage on the other two of said output connections, a switch through which the motor to be controlled is connected to the three current supply lines, and control means powered from said direct current power source and monitored by said sensing circuit for effecting opening of the switch when a potential difference appears across the branch lines.

5. Apparatus for protecting a polyphase motor against phase voltage imbalance comprising three voltage transformers having primary windings, each primary winding being shunted across two of the three lines of a polyphase current supply source with each winding being across a different two of the three lines, a separate secondary winding for each transformer, a separate rectifier circuit connected across each transformer secondary, each rectifier circuit having a unipolar output connection with the polarities of the several output connections being of the same sign, corresponding points of the rectifier circuits of opposite sign to said output connections being connected together, a branch line to which each of the said output connections is separately connected through a diode, the diodes from each outlet connection to said first branch all being effective to block current flow in the same direction, a second branch line to which each of the said output connections is separately connected through a diode, the diodes connecting the output connections to the second branch being effective in the opposite direction to those for the first branch with said branches and their diodes constituting the only common circuit between the said output connections whereby a potential difference will appear between said branch lines when any rectifier circuit having a voltage at the output connection thereof is below that of the output connections of the other rectifier circuits, and control means connected across said branch lines for opening the circuit to a motor to be protected by said apparatus.

6. Apparatus for protecting a polyphase motor against phase voltage imbalance as defined in claim 5 in which each of the first-named rectifier circuits is a half-wave rectifier, and in which said control means for opening the switch comprises an oscillating circuit into which the two branch lines are connected at points to control oscillation thereof, and the output of the oscillating circuit through a transformer energizes a motor switch controlling relay, said apparatus also comprising a second rectifier circuit in parallel with the first but effective to rectify that half of the wave cycle not rectified by the first, said second rectifier circuits having their outputs connected to each other in parallel to provide a single direct current power source, said power source being connected with the oscillating circuit for supplying actuating power thereto.

7. Apparatus for protecting a polyphase motor against phase voltage imbalance as defined in claim 6 in which the oscillating circuit oscillates continuously as long as the two branch lines are at equal potential but wherein a voltage difference across said branch lines suppresses oscillation in said circuit, the said relay being energized by the output of the oscillating circuit through a transformer, whereby the relay is deenergized when oscillation in the oscillating circuit is suppressed, and a motor switch controlled by said relay and which is held closed only so long as the relay is energized.

8. A phase voltage failure protective system for polyphase motors comprising a plurality of transformers having their primary windings each energized by one phase only of a polyphase current source, each transformer having a separate secondary having a half-wave rectifier connected across its terminals, the rectified current of corresponding polarity from each half-wave rectifier being connected to a sensing circuit, the sensing circuit comprising two branch lines to one of which the selected pole of each half-wave rectifier is connected through a separate diode and to the other of which the same pole is connected through a separate diode, the diodes from each pole to the two branches being operatively reversed, the said branch lines and diodes constituting the only circuit connecting the selected poles, whereby said branch lines are at equal potential when all phase voltages of the polyphase lines are equal and a potential difference arises when one phase is out of balance with the others, and means responsive to a potential difference across said branch lines for opening a circuit to a motor which is controlled by said protective system.

9. In an electrical system comprising a polyphase motor and three lines through which a polyphase current is supplied thereto, a protecting apparatus for protecting the motor against voltage imbalance in one phase comprising a separate voltage transformer having its primary connected across a different two of three lines, each transformer having a secondary, a separate rectifier circuit connected across the secondary of each transformer, each rectifier having a direct current output connection of like polarity, a common sensing circuit connected to said connection of each rectifier circuit, said sensing circuit having two branches each connected to said output connections of the several rectifier circuits through diodes with the diodes of one branch being operatively reversed to those of the other whereby said branches are at equal potential as long as the phase voltages are in balance, but across which a potential difference arises if the phase voltages are not in balance, a control circuit comprising an oscillation generator circuit into which said branch lines are connected to produce a biasing voltage which suppresses oscillations when a potential difference occurs between the said two branches, and a motor control switch inductively coupled to the oscillation circuit with means for holding the switch closed only when the oscillation circuit is in oscillation.

References Cited by the Examiner

UNITED STATES PATENTS

| | | | |
|---|---|---|---|
| 1,980,395 | 11/34 | FitzGerald | 317—52 |
| 2,393,043 | 1/46 | Harder | 317—52 |
| 3,037,151 | 5/62 | Cimerman | 317—31 |

SAMUEL BERNSTEIN, *Primary Examiner.*